United States Patent
Kang et al.

(10) Patent No.: US 8,385,641 B2
(45) Date of Patent: *Feb. 26, 2013

(54) METHOD AND APPARATUS FOR ELIMINATING CHROMATIC ABERRATION

(75) Inventors: Moon-gi Kang, Seoul (KR);
Joon-young Chang, Seoul (KR);
Jong-hyun Park, Seoul (KR); Hee Kang, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 779 days.

This patent is subject to a terminal disclaimer.

(21) Appl. No.: 12/512,140

(22) Filed: Jul. 30, 2009

(65) Prior Publication Data

US 2010/0027886 A1   Feb. 4, 2010

(30) Foreign Application Priority Data

Jul. 30, 2008   (KR) .................. 10-2008-0074722

(51) Int. Cl.
*G06K 9/00* (2006.01)
*G06K 9/34* (2006.01)
(52) U.S. Cl. ........................................ 382/167
(58) Field of Classification Search ........ 382/162, 382/164, 167, 275; 348/241, 242, 335, 360, 348/361, 453, 743, E7.003, E9.037; 353/31; 358/401, 518; 359/652, 654

See application file for complete search history.

(56) References Cited

U.S. PATENT DOCUMENTS

| | | | | |
|---|---|---|---|---|
| 5,307,175 | A | * | 4/1994 | Seachman ............... 358/401 |
| 5,841,586 | A | * | 11/1998 | Nagaoka ............... 359/654 |
| 6,851,811 | B2 | * | 2/2005 | Akiyama ............... 353/31 |
| 7,916,937 | B2 | * | 3/2011 | Utsugi et al. ............... 382/162 |
| 8,089,555 | B2 | * | 1/2012 | Vakrat et al. ............... 348/360 |
| 8,098,440 | B2 | * | 1/2012 | Jethmalani et al. ........... 359/652 |
| 2007/0035641 | A1 | * | 2/2007 | Yamada et al. ............... 348/241 |
| 2008/0298678 | A1 | * | 12/2008 | Kang ............... 382/167 |
| 2009/0052769 | A1 | * | 2/2009 | Kang et al. ............... 382/162 |
| 2010/0027886 | A1 | * | 2/2010 | Kang et al. ............... 382/167 |
| 2010/0110238 | A1 | * | 5/2010 | Kang et al. ............... 348/242 |

OTHER PUBLICATIONS

Boult et al., "Correcting Chromatic Aberrations Using Image Warping," 1992 IEEE Computer Society Conference on Computer Vision and Pattern Recognition, Proceedings CVPR'92, pp. 684-687 (1992).

Kang, "Automatic Removal of Chromatic Aberration from a Single Image," IEEE Conf. on Computer Vision and Pattern Recognition, pp. 1-8 (Jun. 2007).

Kaufmann et al., "Elimination of Color Fringes in Digital Photographs Caused by Lateral Chromatic Aberration," CIPA 2005 XX International Symposium, Sep. 26-Oct. 1, 2005, Torino, Italy, pp. 1-6 (2005).

* cited by examiner

*Primary Examiner* — Amir Alavi
(74) *Attorney, Agent, or Firm* — Drinker Biddle & Reath LLP

(57) ABSTRACT

A method and apparatus for eliminating chromatic aberration; in an embodiment, only the chrominance signal is filtered in the luminance/chrominance coordinates so as to eliminate the chromatic aberration so that the chromatic aberration can be eliminated regardless of a property of a lens. In addition, there are advantages in not only eliminating the chromatic aberration but also preventing resolution of the original image from being damaged.

20 Claims, 8 Drawing Sheets

310  330  320

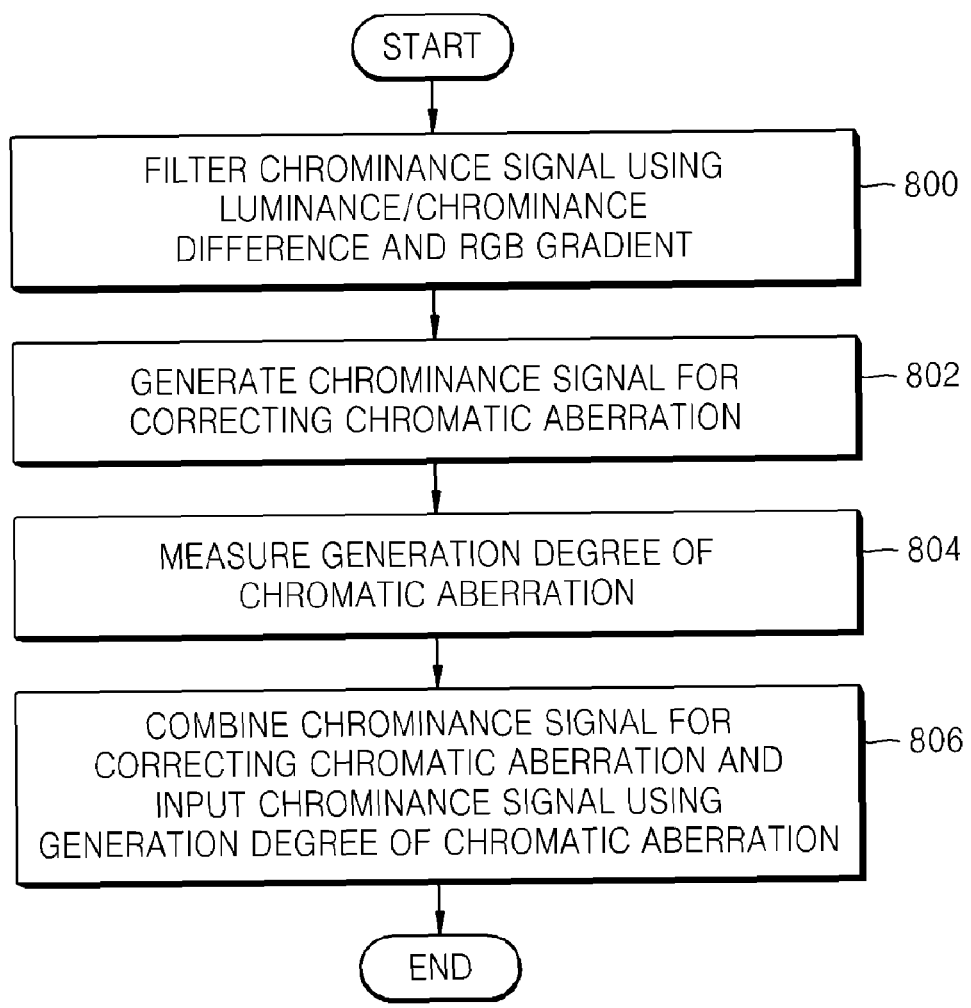

METHOD AND APPARATUS FOR ELIMINATING CHROMATIC ABERRATION

CROSS-REFERENCE TO RELATED PATENT APPLICATION

This application claims the benefit of Korean Patent Application No. 10-2008-0074722, filed on Jul. 30, 2008, in the Korean Intellectual Property Office, the disclosure of which is incorporated herein in its entirety by reference.

BACKGROUND OF THE INVENTION

1. Field of the Invention

The present invention relates to image processing, and more particularly, to a method and apparatus for eliminating chromatic aberration.

2. Description of the Related Art

Chromatic Aberration (CA) is an aberration caused by a difference in refractive index according to different wavelengths of light. In an ideal lens, white light that is incident to the lens must be focused on one point of an image formed on a plane after the white light passes through the lens. However, in an actual lens, light having a relatively short wavelength is refracted more than light having a relatively long wavelength so that focus varies according to the wavelengths of light due to the difference in refractive index according to the different wavelengths. In other words, focus varies according to colors of light. A color image is formed of colors such as red (R), green (G), and blue (B). As described above, light of different colors focuses on different spots due to an effect of the lens and thus, false colors are generated in the image. This is known as chromatic aberration.

Chromatic aberration may be mainly classified into longitudinal chromatic aberration and lateral chromatic aberration. Longitudinal chromatic aberration is caused due to a focus difference on an optical axis, and lateral chromatic aberration is caused due to a difference in magnification according to color. Longitudinal chromatic aberration and lateral chromatic aberration are not generated separately and instead, are generated together.

Chromatic aberration may be observed in most optical devices using a lens. In manufacturing of the lens used in optical devices, various lenses are combined to correct the chromatic aberration. However, even if the lenses are combined, chromatic aberration cannot be completely eliminated. Also, in most cameras installed in mobile phones and typical compact cameras, inexpensive lenses are used and thus, the chromatic aberration may be more conspicuous. Moreover, although resolutions of cameras installed in mobile phones and digital cameras are rapidly increasing, lens quality does not proportionally increase due to cost and size of the lenses. That is, chromatic aberration is generated mostly in cameras and manufacturers of the cameras try to reduce the chromatic aberration.

A conventional method of eliminating chromatic aberration comprises matching sizes of three channels, R, G, and B, in order to compensate the chromatic aberration generated due to lateral chromatic aberration. In order to match the sizes of the three channels, an interpolation process is required, in which displacement in each channel is predicted, a proportion of a size of an image is obtained through predicted information, and the sizes of two channels are matched to the size of the remaining single channel. Here, shifts and scaling parameters of the R, G, and B channels are calculated according to a registration algorithm, the registration algorithm using a black and white image having a specific pattern. That is, corner points having the specific pattern are extracted and matched for each channel and then, scaling information is identified using the corner points.

In the conventional method, lateral chromatic aberration can be efficiently eliminated as the sizes of the images are matched by predicting displacement of the channels. However, if the conventional method is used, registration information must be previously predicted by each lens through the specific pattern and then, the chromatic aberration is eliminated using the parameters (that is, registration information must be known for all lenses in advance), and extracting the parameters and eliminating the chromatic aberration are separated since the registration algorithm must be performed independently by using the image having the specific pattern. In addition, the conventional method is not effective in DSLR cameras in which lenses are changed. Furthermore, DSLR cameras have limitations in correcting chromatic aberration caused by longitudinal chromatic aberration and lateral chromatic aberration together since longitudinal chromatic aberration is not considered in DSLR cameras.

SUMMARY OF THE INVENTION

The present invention provides a method and apparatus for eliminating chromatic aberration by using an input image only without advance information of each lens and by filtering a chrominance signal only from a luminance/chrominance coordinate system.

According to an aspect of the present invention, there is provided a method of eliminating chromatic aberration, the method including: receiving RGB signals and luminance/chrominance signals obtained by converting the RGB signals and calculating RGB gradients using the RGB signals and a luminance/chrominance difference using the luminance/chrominance signals; and filtering the chrominance signal of the luminance/chrominance signal by reflecting the calculated RGB gradient and the luminance/chrominance difference and generating a chrominance signal for correcting the chromatic aberration.

The luminance and chrominance signals may include luminance and chrominance signals of a color space coordinates system including one of YUV, YCbCr, Lab and YCC.

The method may further include: determining the generation degree of the chromatic aberration using the luminance signal; and combining the chrominance signal for correcting the chromatic aberration with the received chrominance signals according to the generation degree of the chromatic aberration.

The RGB gradient and the luminance/chrominance difference may be calculated in the horizontal and vertical directions, and the received chrominance signals may be filtered using the RGB gradients and the luminance/chrominance difference, which are calculated in the horizontal direction, and are filtered the RGB gradients and the luminance/chrominance difference, which are calculated in the vertical direction.

The method may further include selecting one of the chrominance signals obtained by filtering the received chrominance signals in the horizontal and vertical directions as a chrominance signal for correcting chromatic aberration.

A chrominance signal having small intensity may be selected from the chrominance signals obtained by filtering the received chrominance signals in the horizontal and vertical directions.

The determining of the degree of chromatic aberration may include: searching for the minimum and maximum values of the received luminance signal in the horizontal and vertical directions; and selecting and outputting RGB values corresponding to a larger minimum value and a maximum value from among the searched minimum and maximum values by using the RGB signals.

The combining of the chrominance signal for correcting the chromatic aberration with the received chrominance signals may include: generating weights by using the RGB values corresponding to the output minimum value and maximum value; and combining received chrominance signal for correcting the chromatic aberration with the received chrominance signals according to the generated weights.

The method may further include: adjusting the received luminance signal according to the received chrominance signals; and converting the adjusted luminance signal and the result of combining input chrominance signal for correcting the chromatic aberration with the received chrominance signals into final RGB signals.

The receiving of the RGB signals and the luminance and chrominance signals and the calculating of the RGB gradients and the luminance/chrominance difference may include calculating a color difference between the R and G signals and the B and G signals using the RGB signals and the generating of the chrominance signal for correcting chromatic aberration comprises filtering the received chrominance signal by reflecting a larger value from among a gradient of the R signal and the calculated color difference between the R and G signals and a larger value from among a gradient of the B signal and the calculated color difference between the B and G signals.

According to another aspect of the present invention, there is provided a method of generating a chrominance signal for correcting chromatic aberration of a current pixel, the method comprising calculating the chrominance signal for correcting chromatic aberration in a current pixel by assigning a weight to values of chrominance signals of pixels adjacent to the current pixel and averaging the resultant values from among luminance and chrominance signals converted from RGB signals, wherein the weight is calculated using RGB gradients of the adjacent pixels, a color difference of the adjacent pixels, and a luminance/chrominance difference between the current pixel and the adjacent pixels.

According to another aspect of the present invention, there is provided an apparatus for eliminating chromatic aberration, the apparatus including: a RGB gradient calculating unit calculating RGB gradients using RGB signals; a luminance/chrominance difference calculating unit receiving luminance/chrominance signals converted from the RGB signals and calculating a luminance/chrominance difference using the received luminance/chrominance signals; and a chrominance signal filtering unit filtering the chrominance signals by reflecting the calculated RGB gradients and the luminance/chrominance difference and generating a chrominance signal for correcting the chromatic aberration.

The luminance and chrominance signals may include luminance and chrominance signals of a color space coordinates system including one of YUV, YCbCr, Lab and YCC.

The apparatus may further include: a chromatic aberration generation degree determining unit determining the generation degree of chromatic aberration using the luminance signal; and a chrominance signal combining unit combining the chrominance signal for correcting chromatic aberration with the received chrominance signals according to the generation degree of chromatic aberration.

The RGB gradient calculating unit may include: a horizontal direction RGB gradient calculating unit and a vertical direction gradient calculating unit which respectively calculate the RGB gradients in a horizontal direction and a vertical direction, the luminance/chrominance difference calculating unit may include: a horizontal direction luminance/chrominance difference calculating unit and a vertical direction luminance/chrominance difference calculating unit which respectively calculate the luminance/chrominance difference in the horizontal direction and the vertical direction, and the chrominance signal filtering unit may include: a horizontal direction chrominance filtering unit and a vertical direction chrominance signal filtering unit which respectively filter the received chrominance signals in the horizontal direction and the vertical direction using the RGB and the luminance difference calculated in the horizontal direction and the vertical direction; and a chrominance signal selecting unit for selecting one of the chrominance signals for correcting the chromatic aberration, which are obtained by filtering the received chrominance signals in the horizontal and vertical directions.

The chrominance signal selecting unit may select a signal having small intensity from among chrominance signals for correcting chromatic aberration, which are obtained by filtering the received chrominance signals in the horizontal and vertical directions.

The chromatic aberration generation degree determining unit may include: horizontal and vertical direction minimum/maximum searching units searching for the minimum and maximum values of the received luminance signal in the horizontal and vertical directions; and a RGB selection outputting unit selecting and outputting RGB values corresponding to a larger minimum value and a maximum value from among the searched minimum and maximum values by using the RGB signals.

The chrominance signal combining unit may include: a weight generating unit generating weights by using the RGB values corresponding to the output minimum value and maximum value; and a combining unit combining received chrominance signal for correcting the chromatic aberration with the received chrominance signals according to the generated weights.

The apparatus may further include: a luminance signal adjusting unit adjusting the received luminance signal by using the received chrominance signals; and a RGB converting unit converting the luminance signal received from the luminance signal adjusting unit and the chrominance signal received from the chrominance signal combining unit into the RGB signals.

According to another aspect of the present invention, there is provided a computer readable recording medium having recorded thereto a computer program for executing the method above.

BRIEF DESCRIPTION OF THE DRAWINGS

The above and other features and advantages of the present invention will become more apparent by describing in detail exemplary embodiments thereof with reference to the attached drawings in which:

FIG. 8 is a flowchart illustrating a method of eliminating chromatic aberration, according to an embodiment of the present invention.

DETAILED DESCRIPTION OF THE INVENTION

Hereinafter, the present invention will be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Also, the terms used herein are defined according to the functions of the present invention. Thus, the terms may vary depending on users or operators and usages. That is, the terms used herein must be understood based on the descriptions made herein.

Figure 1:
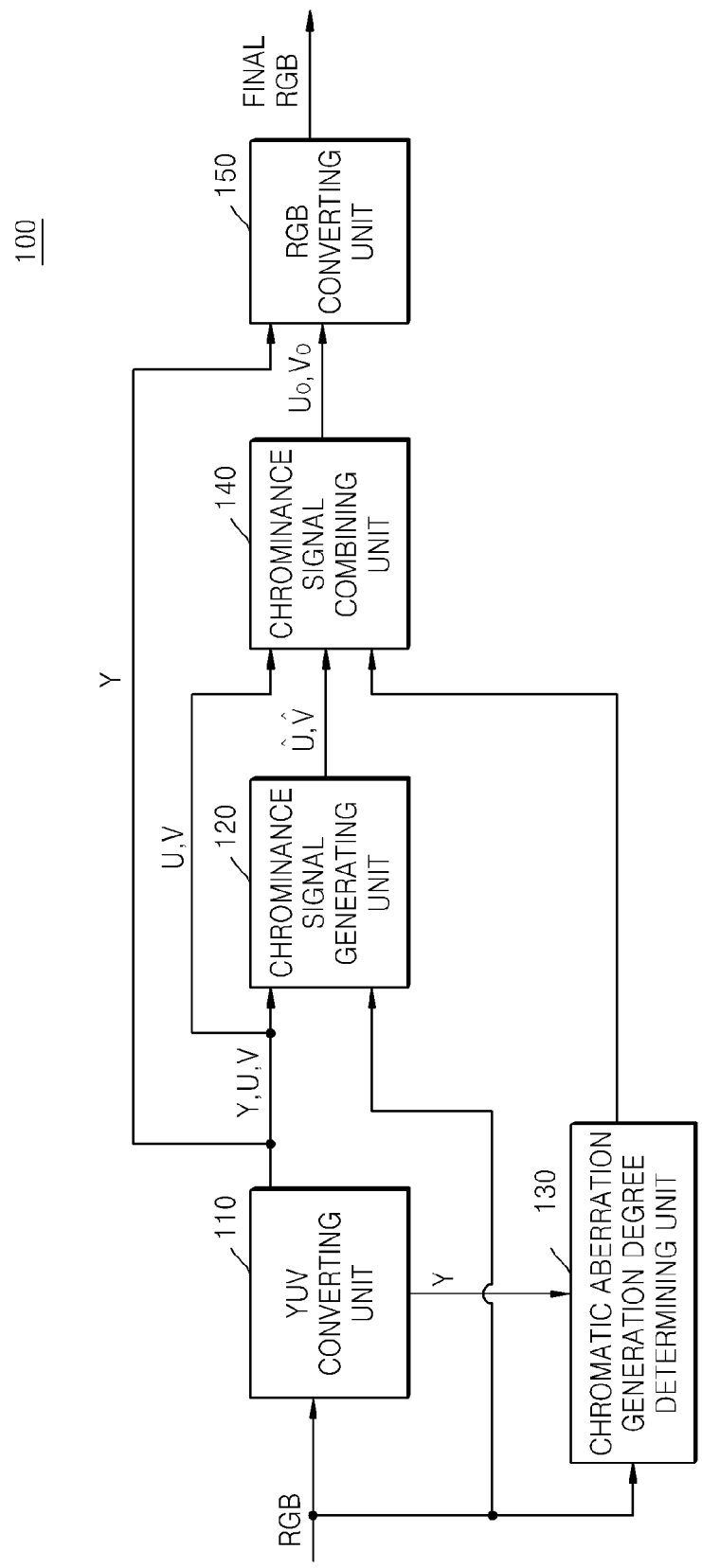
FIG. 1 is a block diagram schematically illustrating an apparatus for eliminating chromatic aberration, according to an embodiment of the present invention.

FIG. 1 is a block diagram schematically illustrating an apparatus 100 for eliminating chromatic aberration, according to an embodiment of the present invention.

Referring to FIG. 1, the apparatus 100 for eliminating chromatic aberration according to the present embodiment includes a YUV converting unit 110, a chrominance signal generating unit 120, a chromatic aberration generation degree determining unit 130, a chrominance signal combining unit 140, and a RGB converting unit 150.

The YUV converting unit 110 receives RGB signals and converts the received RGB signals into YUV signals. According to the current embodiment, the RGB signals are converted into YUV signals. However, such conversion can be also applied to YUV conversion coordinates, as well as other color space coordinates, for example, other luminance/chrominance coordinates such as YCrCb, Lab, and YCC.

The YUV converting unit 110 converts the RGB signals into YUV signals using Equation 1 below.

$$\begin{bmatrix} Y_i \\ U_i \\ V_i \end{bmatrix} = \begin{bmatrix} 0.299 & 0.587 & 0.114 \\ -0.169 & -0.331 & 0.5 \\ 0.5 & -0.419 & -0.082 \end{bmatrix} \cdot \begin{bmatrix} R_i \\ G_i \\ B_i \end{bmatrix} \quad \text{[Equation 1]}$$

Here, $[R_i\ G_i\ B_i]^T$ are respectively denoted as R, G, and B of an input image, wherein $R_i$, $G_i$, and $B_i$ are respectively denoted as a red channel signal, a green channel signal, and a blue channel signal. $[Y_i\ U_i\ V_i]$ are denoted as conversion values of the input R, G, and B into Y, U, and V, wherein $Y_i$ is denoted as a luminance signal and $U_i$ and $V_i$ are denoted as chrominance signals.

The chrominance signal generating unit 120 receives the RGB signals and luminance/chrominance signals (YUV signals) obtained by converting the RGB signals in the YUV converting unit 110. The chrominance signal generating unit 120 calculates a RGB gradient using the RGB signals. In addition, the chrominance signal generating unit 120 calculates a luminance/chrominance difference using the luminance/chrominance signals and filters the chrominance signals U and V by reflecting the calculated RGB gradient and the luminance/chrominance difference, thereby generating the chrominance signals for correcting the chromatic aberration. In other words, the chromatic aberration is eliminated using all input RGB signals and the YUV signals, which are obtained by converting the RGB signals, in the current embodiment. Domains in which actual filtering is performed, are the U and V domains and the chromatic aberration is eliminated in the U and V domains using a space adaptive weight designed using all of the input RGB signals and the YUV signals.

The method of eliminating the chromatic aberration according to the current embodiment is executed as in Equation 2 below.

$$U_o(i,j) = a_U(i,j) \cdot \{U_i(i,j) - \hat{U}(i,j)\} + \hat{U}(i,j)$$

$$V_o(i,j) = a_V(i,j) \cdot \{V_i(i,j) - \hat{V}(i,j)\} + \hat{V}(i,j) \quad \text{[Equation 2]}$$

Here, (i,j) are denoted as vertical and horizontal coordinates of an image. $\hat{U}(i,j)$ and $\hat{V}(i,j)$ are denoted as the chrominance signals for correcting the chromatic aberration which respectively correspond to U and V signals. $a_U(i,j)$ and $a_V(i,j)$ are the space adaptive weights for combining the input chrominance signals and the chrominance signals for correcting the chromatic aberration and are determined by a generation degree of the chromatic aberration. Hereinafter, for convenience of an equation theorem, U and V are expressed in a variable C, which denotes the chrominance for the chrominance signal. Equation 2 is re-expressed in Equation 3 below using the variable C.

$$C_o(i,j) = a_c(i,j) \cdot \{C_i(i,j) - \hat{C}(i,j)\} + \hat{C}(i,j) \quad \text{[Equation 3]}$$

Here, C is denoted as U and V.

A principle of eliminating chromatic aberration according to the current embodiment of the present invention will now be described with reference to FIGS. 3A and 3B.

Figure 3A:
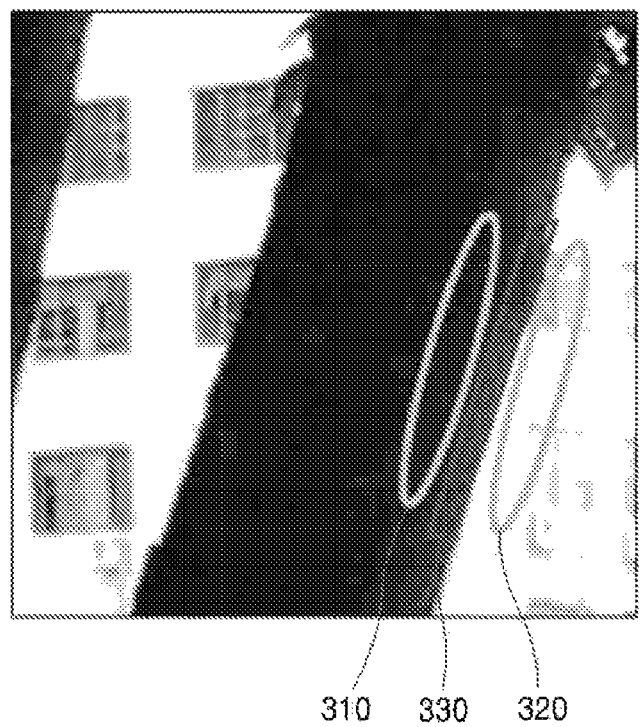
FIGS. 3A and 3B are diagrams respectively illustrating chromatic aberration generating portions and chromatic aberration generating regions.
Figure 3B:
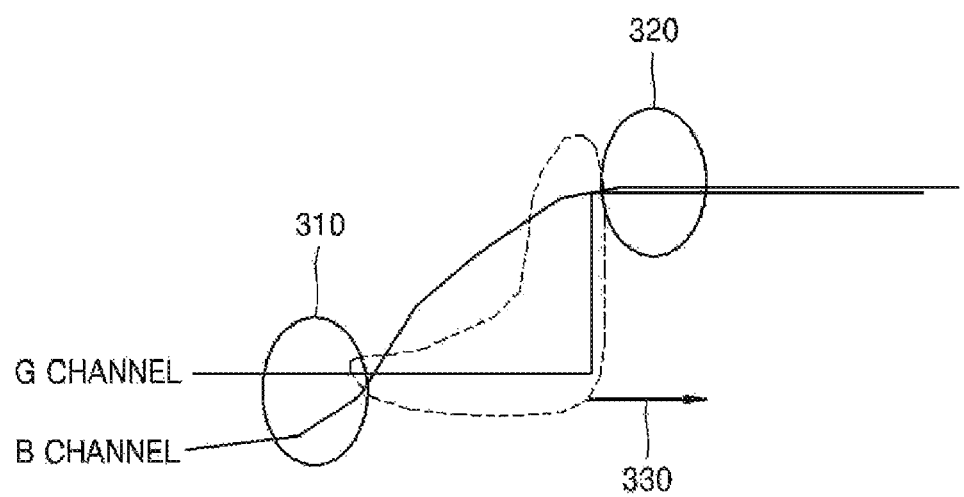

FIGS. 3A and 3B are diagrams respectively illustrating chromatic aberration generating portions and chromatic aberration generating regions.

Referring to FIGS. 3A and 3B, the region where the chromatic aberration is generated is represented with the reference numeral 330. The principle of eliminating chromatic aberration according to the current embodiment comprises removing false colors from the region where the chromatic aberration is generated using the chrominance signals of both portions 310 and 320 where the chromatic aberration is generated, in order to generate the chrominance signals for correcting the chromatic aberration.

Referring to FIG. 3B, gradient values in each of the G and B channels increase in the region 330 where the chromatic aberration is generated. Thus, a false color is removed using a property of the region 330. That is, since the chromatic aberration generating region 330 has large gradient values in each channel, the chromatic aberration is removed using the color of the region having the large gradient value.

The chrominance signal generating unit 120 filters the chrominance signal to generate the chrominance signal for correcting the chromatic aberration. The chrominance signal for correcting the chromatic aberration of a current pixel calculates the chrominance signals of pixels adjacent to the current pixel from the luminance/chrominance signals, which are converted from the RGB signals, by weighted calculating by a predetermined weight. Here, the weight may be calculated from a RGB gradient and a color difference of the adjacent pixels and a luminance/chrominance difference between the current pixel and the adjacent pixels. More specifically, in order to generate the chrominance signal for correcting the chromatic aberration, the chrominance signal is filtered and more preferably, the chrominance signal is filtered one-dimensionally in vertical and horizontal directions in order to reduce calculation. Then, the result of filtering in a direction having a color more close to an achromatic color from among the chrominance signals for correcting the chromatic aberration obtained in both directions is used as the final chrominance signals for correcting the chromatic aberration. Hereinafter, for convenience of expansion of an equation, filtering in a horizontal direction is only described. Filtering in a vertical direction is exactly the same as filtering in a horizontal direction, except for a smaller size of a mask.

Equation 4 represents the chrominance signal C filtered in a horizontal direction.

$$\hat{C}_h(i, j) = \frac{\sum_{l=-L_2}^{L_1} S_C(i, j+l) \cdot w_C(i, j+l) \cdot C_i(i, j+l)}{\sum_{l=-L_2}^{L_1} S_C(i, j+l) \cdot w_C(i, j+l)}$$ [Equation 4]

Here, (i,j) are denoted as variables for indicating locations of pixels currently being processed and l is denoted as a variable for indicating addresses of adjacent pixels to be used in filtering which are located in a horizontal direction. l has a range of $-L_2 \leq l \leq L_1$ ($L_1$ and $L_2$ are positive numbers) and $\hat{C}_h(i,j)$ is denoted as a chrominance signal for correcting the chromatic aberration obtained by filtering the chrominance signal in a horizontal direction. According to Equation 4 above, $\hat{C}_h(i,j)$ is obtained by the weighted sum of the adjacent pixels. That is, $\hat{C}_h(i,j)$ is obtained by averaging the value obtained by multiplying the weight of $S_C(i,j+l)*w_C(i,j+l)$ by the $C_i(i,j+l)$, the value of the adjacent pixel. Here, $S_C(i,j+l)$ is a switching function that prevent adjacent pixels whose colors are different from the color of the current pixel from being considered during the above averaging operations. $S_C(i,j+l)$ can be obtained as in Equation 5.

$$S_C(i, j+l) = \begin{cases} 1, & \text{if sign}\{C_i(i,j)\} = \text{sign}\{C_i(i,j+l)\} \text{ or } |C_i(i,j)| < T \\ 0, & \text{otherwise} \end{cases}$$ [Equation 5]

Here, sign{x} is a function for determining a sign of x. When a value of $C_i(i,j+l)$ has the same sign as a value of a center pixel, $C_i(i,j)$, sign{x} returns with "1" so as to be used in filtering. In addition to this, when a value of $C_i(i,j+l)$ has a color that is somewhat close to an achromatic color, for example, $|C_i(i,j)|<T$, sign{x} returns with "1" so as to be used in filtering. In the current embodiment, T is used as a threshold value for determining the degree of closeness to an achromatic color and may be arbitrarily determined, for example, 10. Except for these two cases, it is considered that the color is remarkably different from the value of the center pixel, and $S_C(i,j+l)$ returns with "0" so as not to be used in filtering. In other words, since $S_C(i,j+l)$ excludes portions having remarkably different color from filtering and thus, prevents the color of an input image from being changed.

The location where the chromatic aberration is generated is considered in $w_C(i,j+l)$ and a value of $w_C(i,j+l)$ becomes smaller in a pixel value where the chromatic aberration is generated to excluded from the weighted sum. Also, a portion for preventing the color of an input image being damaged is considered in $w_C(i,j+l)$. $w_C(i,j+l)$ can be determined as in Equation 6.

$$w_C(i, j+l) = \begin{cases} \dfrac{1.0}{D_G(i,j+l) + D_B(i,j+l) + D_Y(i,j+l)}, & \text{if } C = U \\ \dfrac{1.0}{D_G(i,j+l) + D_R(i,j+l) + D_Y(i,j+l)}, & \text{if } C = V \end{cases}$$ [Equation 6]

Wherein in $w_C(i,j+l)$, C is a variable for determining whether a channel is U or V. When C is U or V, $w_C(i,j+l)$ can be determined as in Equation 6. Here, $D_G(i,j+l)$, $D_B(i,j+l)$, and $D_R(i,j+l)$ are where the chromatic aberration is cancelled. $D_Y(i,j+l)$ is where the color of the input image is maintained. As described above, in chromatic aberration, the gradient values in each channel increase in the region where the chromatic aberration is generated. Thus, the chrominance signal in a portion where the gradient value increases causes a false color and thus, progresses in a direction to where the chrominance signal is excluded from the weighted sum. The U channel is greatly affected by the G and B channels and thus, the gradient values of the G and B channels are used. The V channel is greatly affected by the G and R channels and thus, the gradient values of the G and R channels are used. Also, a color difference increases in the region of the image where chromatic aberration occurs, since a false color is generated therein. Thus, it is probable that chrominance aberration occurs in the region in which the color difference increases. Accordingly, this region is also excluded from the weighted sum of the neighboring pixels.

The operation of chrominance signal generating unit 120 and $D_G(i,j+l)$, $D_B(i,j+l)$, and $D_R(i,j+l)$, $D_Y(i,j+l)$ will be described later in greater detail with reference to FIGS. 4 and 5.

As illustrated above, the apparatus 100 for eliminating chromatic aberration of FIG. 1 includes the YUV converting unit 110, the chrominance signal generating unit 120, the chromatic aberration generation degree determining unit 130, the chrominance signal combining unit 140, and the RGB converting unit 150. However, the chrominance signal generating unit 120 can perform elimination of the chromatic aberration by itself. In other words, an output signal of the chrominance signal generating unit 120, that is, $\hat{C}(i,j)$, is a signal for correcting generation of the chromatic aberration and the chrominance signal is filtered to remove the false color generated by the chromatic aberration, thereby reducing the chromatic aberration in $\hat{C}(i,j)$.

The chromatic aberration generation degree determining unit 130 and the chrominance signal combining unit 140 compensate damage of the color of the original image during removal of the false color.

The chromatic aberration generation degree determining unit 130 determines the generation degree of the chromatic aberration using a luminance signal Y input from the YUV converting unit 110. In other words, the luminance signal is used to measure the degree of the chromatic aberration. As described above, luminance indicates brightness information of an image and the chromatic aberration is more visible in a region having a large brightness difference. That is, the degree of the chromatic aberration may be measured using contrast information of the luminance signal. Accordingly, in order to measure the generation degree of the chromatic aberration, contrast of an image is obtained and locations of local minimum and maximum values of the luminance signal are respectively obtained in vertical and horizontal directions.

The chromatic aberration generation degree determining unit 130 will be described later in more detail with reference to FIG. 6.

The chrominance signal combining unit 140 combines information about the generation degree of the chromatic aberration output from the chromatic aberration generation degree determining unit 130, the chrominance signal for correcting the chromatic aberration, ($^C$(i,j)), output from the chrominance signal generating unit 120, and an input chrominance signal, ($^C$(i,j)).

Here, the information about the generation degree of the chromatic aberration is calculated using a predetermined weight and a combination ratio of the chrominance signal for correcting the chromatic aberration and the input chrominance signal is determined based on the weight. The chrominance signal combining unit 140 will be described later in more detail with reference to FIG. 7.

The RGB converting unit 150 converts the final chrominance signal $C_O$ from the chrominance signal combining unit 140 and the luminance signal Y received from the YUV conversion unit 110 into final RGB signals. Thus, the final RGB signals are output as an image from which chromatic aberration is eliminated.

In the current embodiment of the present invention, the apparatus 100 for eliminating chromatic aberration includes the RGB converting unit 150. However, the present invention is not limited thereto. For example, in the case of image compression or detail enhancement (DE), the RGB signals are generally converted into the luminance/chrominance coordinates and then are processed. Thus, the corrected luminance/chrominance signal is output after using the luminance/chrominance coordinates so that the output luminance/chrominance signal may be directly input to a compression or DE module and processed.

In another embodiment of the present invention, the compression module or the DE module may be connected to the end of the apparatus 100. In another embodiment of the present invention, in the case of a digital photographing apparatus, for color adjustment, a white balance (WB) device or a color calibration device may be connected to the end of the apparatus 100. In another embodiment of the present invention, a noise cancelation device may be connected to the end of the apparatus 100 in order to cancel noise, and then chromatic aberration may be eliminated FIG. 2 is a block diagram schematically illustrating an apparatus 200 for eliminating chromatic aberration, according to another embodiment of the present invention.

Figure 2:
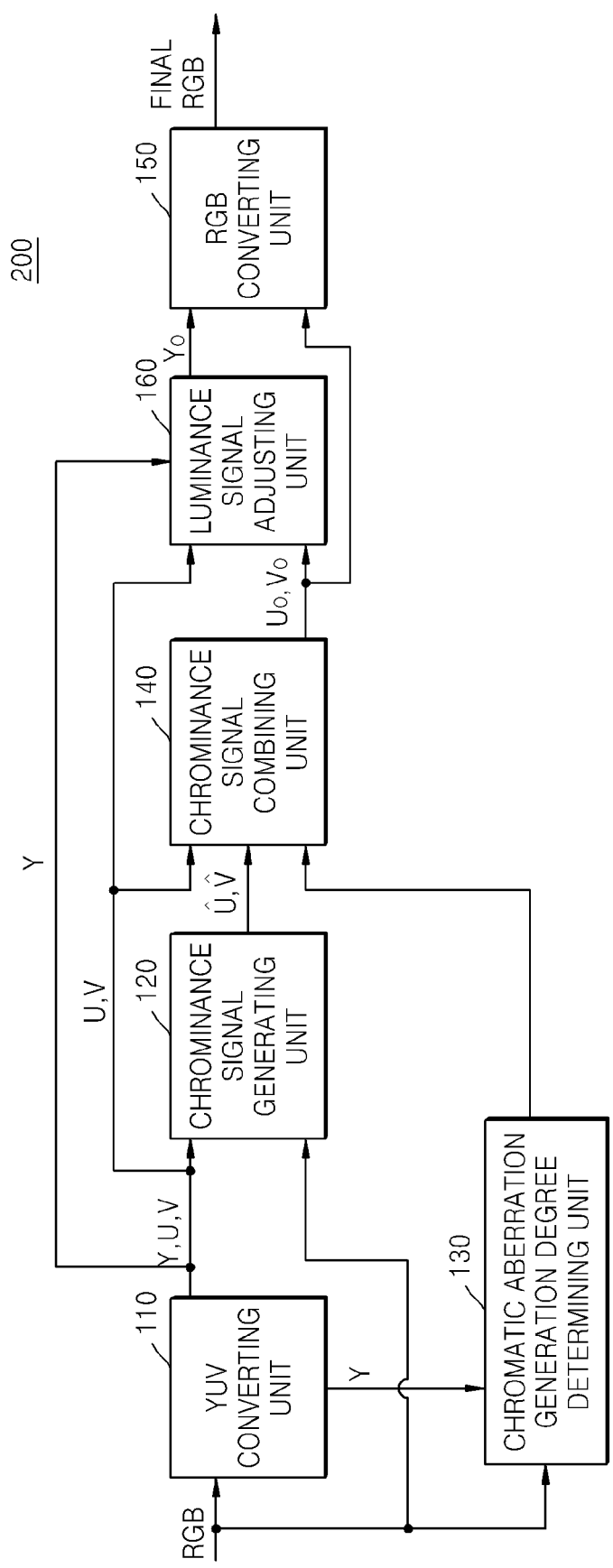
FIG. 2 is a block diagram schematically illustrating an apparatus for eliminating chromatic aberration, according to another embodiment of the present invention.

Referring to FIG. 2, the apparatus 200 for eliminating chromatic aberration according to the present embodiment includes the YUV converting unit 110, the chrominance signal generating unit 120, the chromatic aberration generation degree determining unit 130, the chrominance signal combining unit 140, and the RGB converting unit 150 of the apparatus 100 of FIG. 1, and a luminance signal adjusting unit 160. The difference from the apparatus 100 for eliminating chromatic aberration of FIG. 1 is that the apparatus 200 for cancelling chromatic aberration of FIG. 2 further includes the luminance signal adjusting unit 160. Thus, descriptions of the common elements are not repeated and the luminance signal adjusting unit 160 is mainly described.

The luminance signal adjusting unit 160 adjusts the input luminance signals according to the input chrominance signal. The luminance signal adjusting unit 160 adjusts the input luminance signals using the final chrominance signal output from the chrominance signal combining unit 140 and the input chrominance signal output from the YUV converting unit 110 according to the input chrominance signals $U_i$ and $V_i$ and then, outputs a luminance adjusted signal $Y_o$ to the RGB converting unit 150.

The luminance signal is adjusted because the luminance signal is also affected by the false RGB values. Equation 7 below indicates RGB conversion for describing re-adjustment of the luminance signal.

$$\begin{bmatrix} R_o \\ G_o \\ B_o \end{bmatrix} = \begin{bmatrix} 1 & 0 & 1.4 \\ 1 & -0.345 & -0.714 \\ 1 & 1.77 & 0 \end{bmatrix} \begin{bmatrix} Y_o \\ U_o \\ V_o \end{bmatrix} \quad \text{[Equation 7]}$$

In general, while capturing an image using a camera, the camera focuses on the camera focuses on light in yellow close to green. Thus, the G channel is denoted as being in a well-focused state from among the R, G, and B channels. In the current embodiment, the luminance signal is adjusted after it is assumed that the G channel is in a well-focused state.

If the chromatic aberration is seen as purple, it is deemed that the chromatic aberration is generated by R and B. In this case, since the G channel is in a well-focused state, the chromatic aberration may be generated as the values of R and B are increased more than actual values of R and B. Thus, it is considered that the brightness of a luminance component is higher than that of a real luminance signal since the values of R and B are increased. In this case, the G channel seems to have a correct value and thus, Gi may be the same as Go. However, when purple chromatic aberration is cancelled from the U and V channels, the values of Uo and Vo become smaller than those of Ui and Vi and thus, the value of Go becomes larger than that of Gi as in Equation 7. Accordingly, in order for the value of Go to not be larger than that of Gi and to be the same as that of Gi, the value of Yo must be smaller than that of Yi. Here, in order for the value of Go to be the same as that of Gi, the value of Yo is obtained by subtracting the differences between the values of Uo and Ui and between Vo and Vi from Yi. The value of Go is affected by the values of Uo and Vo which are respectively 0.345 and 0.714 as in Equation 7. Thus, the corrected Yo can be represented as in Equation 8.

$$Y_O(i,j) = Y_i(i,j) - 0.345 \cdot |U_i(i,j) - U_o(i,j)| - 0.714 \cdot |V_i(i,j) - V_O(y,j)| \quad \text{[Equation 8]}$$

If green chromatic aberration is generated and the G channel is a correct value, it is deemed that the chromatic aberration is generated because R and B get dark so that the value of Y has a darker value than a real luminance value. Accordingly, in this case, as described above, in order for the value of Go to not be smaller than that of Gi and to be the same as that of Gi, the value of Yo must be larger than that of Yi. Here, in order for the value of Go to be the same as that of Gi, the value of Yo is obtained by adding the differences between the values of Uo and Ui and between Vo and Vi to Yi. Thus, the corrected Yo can be represented as in Equation 9.

$$Y_o(i,j) = Y_i(i,j) - 0.345 \cdot |U_i(i,j) - U_o(i,j)| - 0.714 \cdot |V_i(i,j) - V_o(y,j)| \quad \text{[Equation 9]}$$

Equation 9 can be expressed as Equation 10 below.

[Equation 10]

$$Y_o(i,j) = \begin{cases} Y_i(i,j) - 0.345 \cdot |U_i(i,j) - U_o(i,j)| - 0.714 \cdot |V_i(i,j) - V_o(i,j)|, \\ \quad \text{if } U_i(i,j) > 0 \text{ and } V_i(i,j) > 0 \\ Y_i(i,j) - 0.345 \cdot |U_i(i,j) - U_o(i,j)| + 0.714 \cdot |V_i(i,j) - V_o(i,j)|, \\ \quad \text{if } U_i(i,j) > 0 \text{ and } V_i(i,j) < 0 \\ Y_i(i,j) + 0.345 \cdot |U_i(i,j) - U_o(i,j)| - 0.714 \cdot |V_i(i,j) - V_o(i,j)|, \\ \quad \text{if } U_i(i,j) < 0 \text{ and } V_i(i,j) > 0 \\ Y_i(i,j) - 0.345 \cdot |U_i(i,j) - U_o(i,j)| - 0.714 \cdot |V_i(i,j) - V_o(i,j)|, \\ \quad \text{if } U_i(i,j) < 0 \text{ and } V_i(i,j) < 0 \end{cases}$$

When the luminance signal is re-adjusted using the method above, the luminance affected by the chromatic aberration is corrected so that contrast of the image improves and thus, quality of the image improves.

Figure 4:
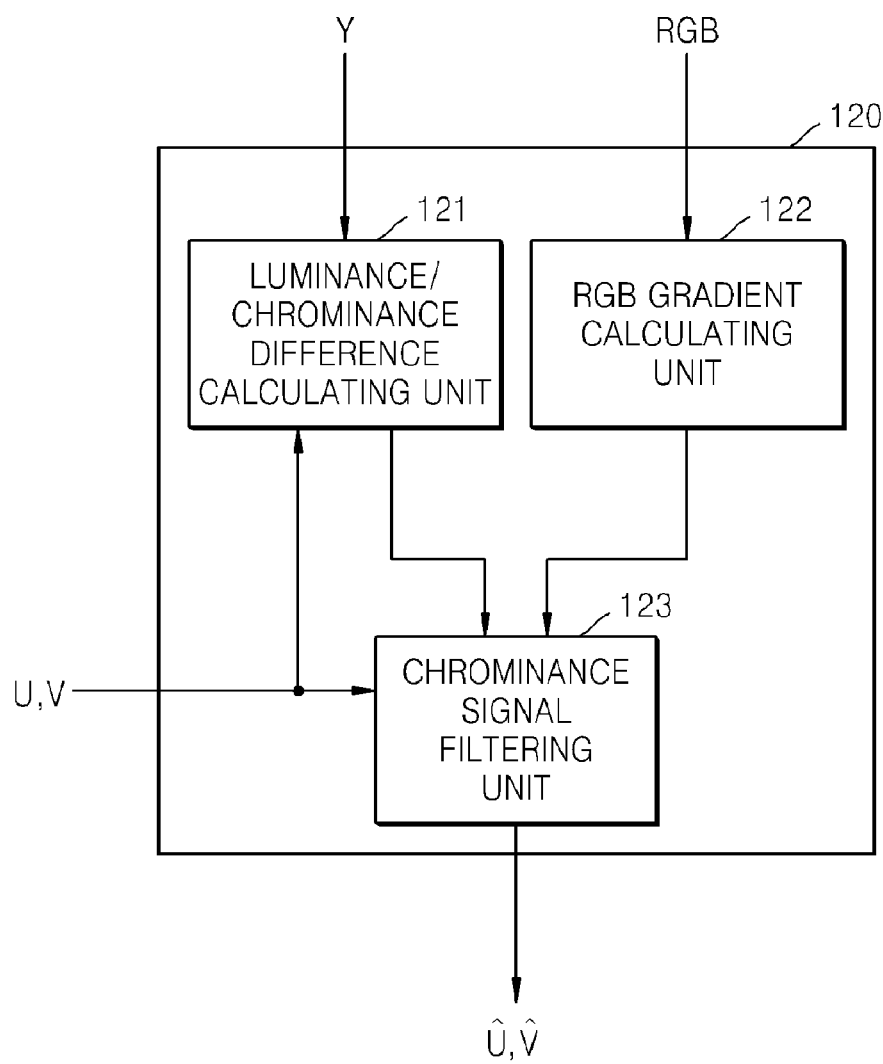
FIG. 4 is a block diagram of a chrominance signal generating unit according to an embodiment of the present invention.

FIG. 4 is a block diagram of the chrominance signal generating unit 120 according to an embodiment of the present invention.

Referring to FIG. 4, the chrominance signal generating unit 120 according to the present embodiment includes a luminance/chrominance difference calculating unit 121, a RGB gradient calculating unit 122, and a chrominance signal filtering unit 123.

The luminance/chrominance difference calculating unit 121 calculates a luminance/chrominance difference using the luminance/chrominance signal output from the YUV converting unit 110. Here, the luminance/chrominance difference includes the difference between the values of luminance and chrominance signals of a current pixel and other pixels that fall within the filtering mask region. In addition, the luminance/chrominance difference may be calculated in a horizontal or a vertical direction, and more preferably, in both horizontal and vertical directions.

In Equation 6, $D_Y(i,j+l)$, which indicates the luminance/chrominance, represents differences in a luminance signal and in a chrominance signal between the center pixel and the pixels existing in a mask region and can be obtained as in Equation 11.

Here, calculation in a horizontal direction is described only.

$$D_Y(i,j+l) = c_y \cdot \max\{|Y_i(i,j+l)|, |C_i(i,j) - C_i(i,j+l)|\} \quad \text{[Equation 11]}$$

That is, Equation 11 includes information about the difference in brightness and color between the pixels existing in the mask and the current pixel. If the difference between the brightness of the current pixel and the other pixels is large, the characteristics of the other pixels are determined to be not similar to those of the current pixel and the other pixels are excluded from a weighted sum of neighboring pixels. Also, if the difference between the color of the current pixel and the other pixels is large, the other pixels are also excluded from the weighted sum of neighboring pixels. In other words, pixels that are less similar to the current pixel are less considered in filtering and thus, the original image can be maintained. Here, the value of $c_y$ is experientially obtained and is a constant value determining how $D_Y(i,j+l)$ is given weight, compared with $D_G(i,j+l)$, $D_B(i,j+l)$, and $D_R(i,j+l)$. As the value of $c_y$ increases, color maintaining effect is increased. However, maintaining color indicates that the chromatic aberration is not satisfactorily eliminated. In the current embodiment, $c_y$ is set as 1.

The RGB gradient calculating unit 122 calculates the gradient values of the R, G, and B channels respectively from the input RGB signals. Here, the gradient values may be calculated in a horizontal or a vertical direction, and more preferably, in both horizontal and vertical directions. As described above, a color difference in the RGB channels may also be considered. The difference in the gradients and color in the RGB channels can be calculated using Equations 12-14.

$$D_G(i, j+l) = \begin{cases} |G_i(i, j+l) - G_i(i, j+l-1)|, & \text{if } l > 0 \\ |G_i(i, j+l) - G_i(i, j+l+1)|, & \text{if } l < 0 \\ 0, & \text{if } l = 0 \end{cases} \quad \text{[Equation 12]}$$

Here, $D_G(i,j+l)$ is denoted as a gradient of the G channel. Here, in order to obtain all gradient values in a given region, a range is divided into l>0, l<0, and l=0.

$$D_B(i, j+l) = \begin{cases} \max[|B_i(i, j+l) - B_i(i, j+l-1)|, c_b \cdot \\ |B_i(i, j+l) - G_i(i, j+l)|], & \text{if } l > 0 \\ \max[|B_i(i, j+l) - B_i(i, j+l+1)|, c_b \cdot \\ |B_i(i, j+l) - G_i(i, j+l)|], & \text{if } l < 0 \\ c_b \cdot |B_i(i, j+l) - G_i(i, j+l)|, & \text{if } l = 0 \end{cases} \quad \text{[Equation 13]}$$

Here, $D_B(i,j+l)$ stores a larger value from among the gradient value of the B channel and a color difference between the G channel and the B channel. $c_b$ is a constant which is to be multiplied by the color difference, the constant being obtained experimentally. In general, since the color difference is larger than the gradient value, $c_b$ is a constant used to appropriately adjust weight for both color difference and gradient value.

$$D_R(i, j+l) = \begin{cases} \max[|R_i(i, j+l) - R_i(i, j+l-1)|, c_r \cdot \\ |R_i(i, j+l) - G_i(i, j+l)|], & \text{if } l > 0 \\ \max[|R_i(i, j+l) - R_i(i, j+l+1)|, c_r \cdot \\ |R_i(i, j+l) - G_i(i, j+l)|], & \text{if } l < 0 \\ c_r \cdot |R_i(i, j+l) - G_i(i, j+l)|, & \text{if } l = 0 \end{cases} \quad \text{[Equation 14]}$$

Here, $D_R(i,j+l)$ stores a larger value from among the gradient value of the R channel and a color difference between the R channel and the G channel. $c_r$ is a constant which is to be multiplied by the color difference, the constant being obtained experimentally. In general, since the color difference is larger than the gradient value, $c_r$ is a constant used to appropriately adjust weight for both color difference and gradient value.

In the current embodiment, $c_b$ and $c_r$ are set to be 0.25.

The function of $D_Y(i,j+l)$ is opposite to those of $D_G(i,j+l)$, $D_B(i,j+l)$, and $D_R(i,j+l)$ described above. $D_G(i,j+l)$, $D_B(i,j+l)$, and $D_R(i,j+l)$ are used to reduce color, whereas $D_Y(i,j+l)$ is used to maintain color. $D_G(i,j+l)$, $D_B(i,j+l)$, and $D_R(i,j+l)$ calculate the gradient values and the color difference in adjacent pixels.

The chrominance signal filtering unit 123 reflects the RGB gradients and the luminance/chrominance difference and filters the chrominance signal, thereby generating the chrominance signal for correcting the chromatic aberration. Here, filtering may be performed in a horizontal or a vertical direction, and more preferably, in both horizontal and vertical directions. Chrominance signal filtering is described above with reference to Equations 4-6.

Figure 5:
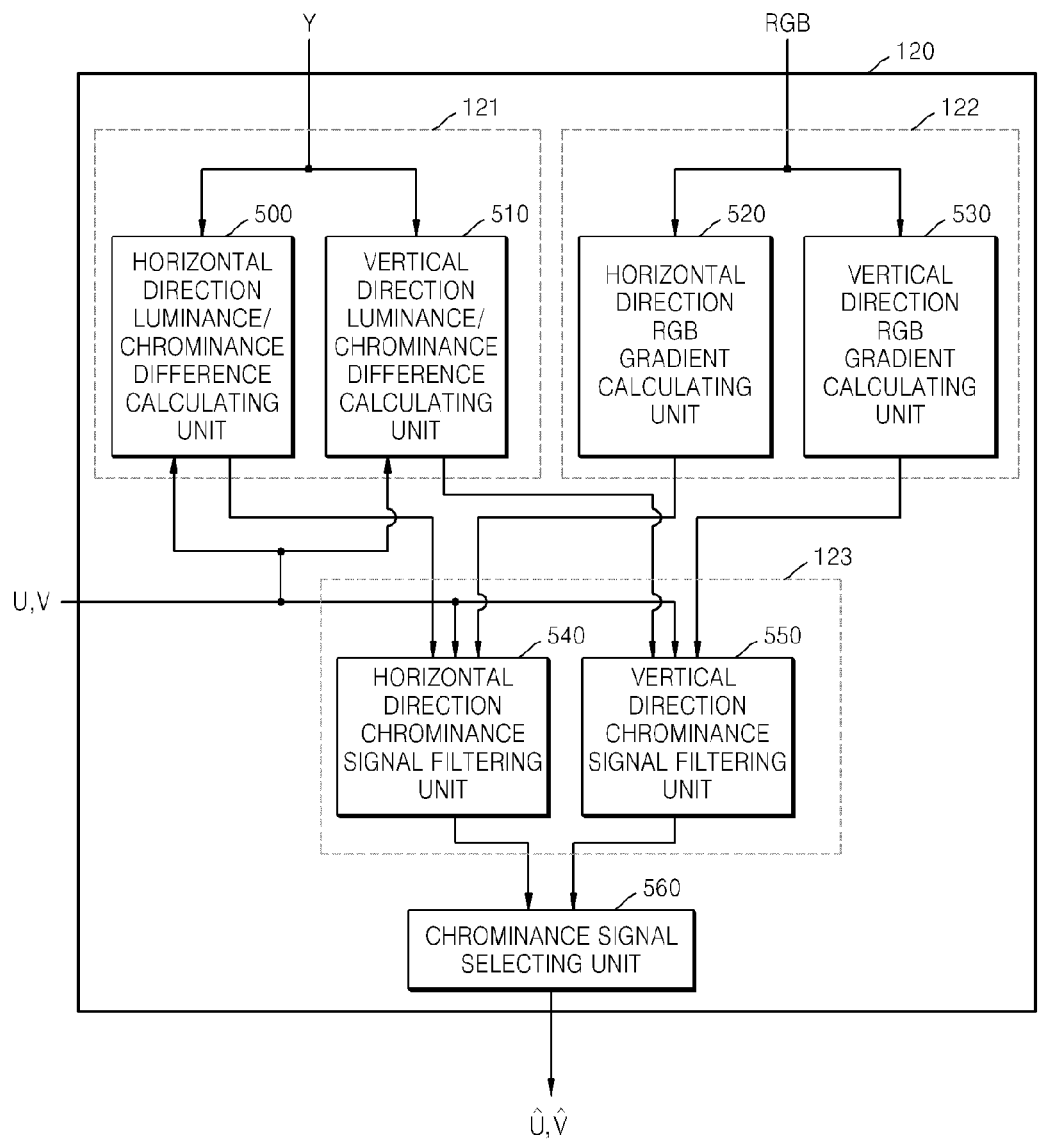
FIG. 5 is a block diagram of a chrominance signal generating unit according to another embodiment of the present invention.

FIG. 5 is a block diagram of the chrominance signal generating unit 120 according to another embodiment of the present invention.

Referring to FIG. 5, the luminance/chrominance difference calculating unit 121 includes a horizontal direction luminance/chrominance difference calculating unit 500 and a vertical direction luminance/chrominance difference calculating unit 510. Also, the RGB gradient calculating unit 122 includes a horizontal direction RGB gradient calculating unit 520 and a vertical direction gradient calculating unit 530.

The chrominance signal filtering unit 123 includes a horizontal direction chrominance filtering unit 540, a vertical direction chrominance signal filtering unit 550, and a chrominance signal selecting unit 560, wherein the chrominance signal selecting unit 560 compares and outputs the results of filtering in a horizontal direction and a vertical direction.

The calculation of the luminance/chrominance difference and the RGB gradients in a horizontal direction are as in Equations 11-14. The calculation of the luminance/chrominance difference and the RGB gradients in a vertical direction are also the same as Equations 11-14.

Filtering in a vertical direction is the same as described with reference to Equation 4 and is the same as filtering in a horizontal direction, except that a size of the mask is small.

The chrominance signal selecting unit 560 compares and outputs the results of filtering in a horizontal direction and a vertical direction respectively output from the horizontal direction chrominance filtering unit 540 and the vertical direction chrominance signal filtering unit 550. More preferably, the final chrominance signal for correcting the chromatic aberration selects the result having less color from among the results of filtering in a horizontal direction and a vertical direction and this is represented as in Equation 15.

$$\hat{C}(i,j) = \begin{cases} \hat{C}_h(i,j), & \text{if } |\hat{C}_h(i,j)| < |\hat{C}_v(i,j)| \\ \hat{C}_v(i,j), & \text{otherwise} \end{cases} \quad \text{[Equation 15]}$$

Here, $\hat{C}_h(i,j)$ and $\hat{C}_v(i,j)$ are respectively denoted as the result of filtering in a horizontal direction and the result of filtering in a vertical direction. The more the value of a chrominance signal approximates to '0', the closer the color of the chrominance signal is to an achromatic color. Thus, in the signal $\hat{C}_h(i,j)$ or $\hat{C}_v(i,j)$, the absolute value of which is less than that of the other signal is considered as having color closer to an achromatic color. Thus, the final chrominance signal $\hat{C}_h(i,j)$ is selected as the signal $\hat{C}_h(i,j)$ or $\hat{C}_v(i,j)$ by using Equation 15.

Figure 6:
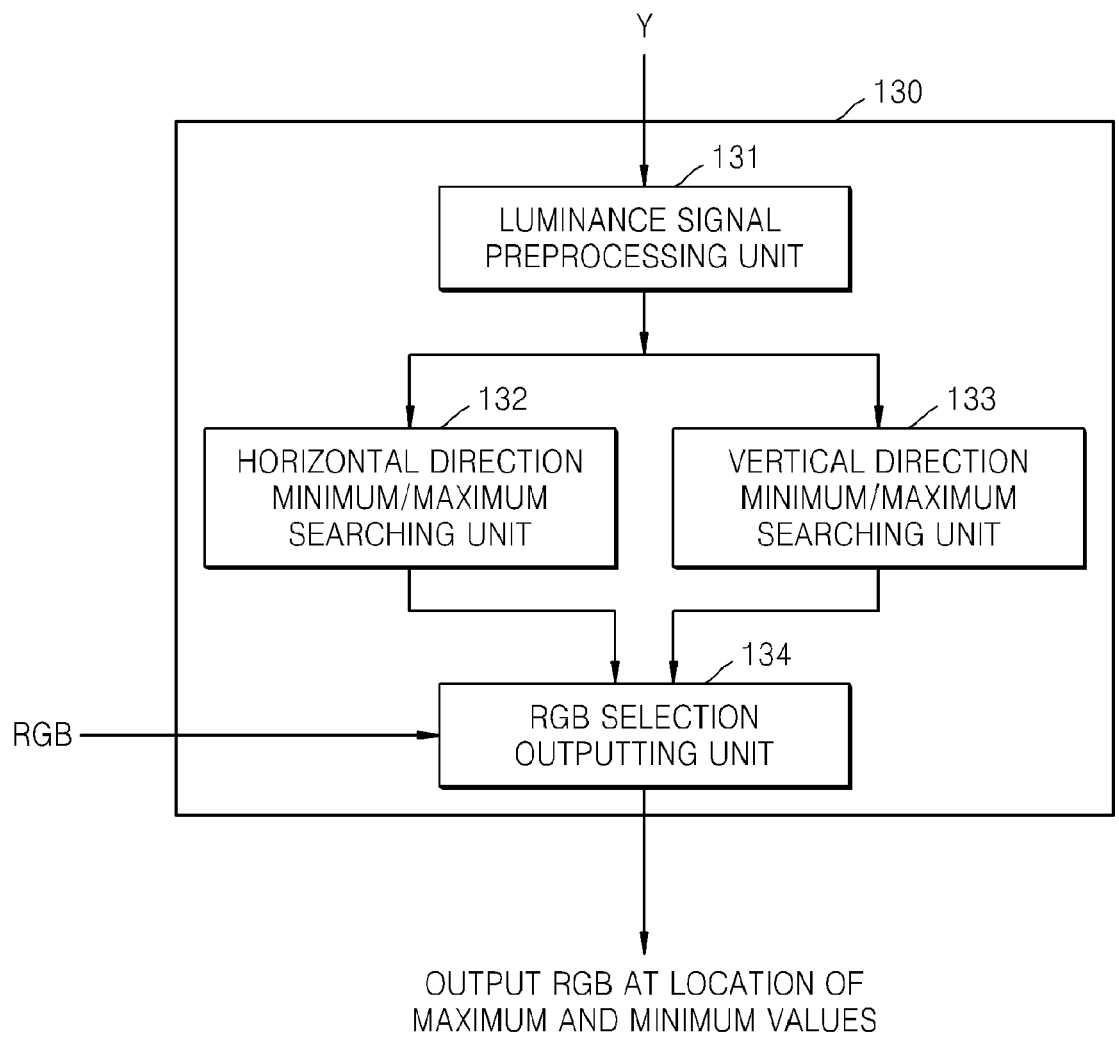
FIG. 6 is a block diagram of a chromatic aberration generation degree determining unit according to an embodiment of the present invention.

FIG. 6 is a block diagram of the chromatic aberration generation degree determining unit 130 according to an embodiment of the present invention.

Referring to FIG. 6, the chromatic aberration generation degree determining unit 130 according to the present embodiment includes a luminance signal preprocessing unit 131, a horizontal direction minimum/maximum searching unit 132, a vertical direction minimum/maximum searching unit 133, and a RGB selection outputting unit 134.

The luminance signal preprocessing unit 131 preprocesses the luminance signal input from the YUV converting unit 110, for example, blurs the luminance signal. Preprocessing of the luminance signal may be selectively performed, according to circumstances.

The horizontal direction minimum/maximum searching unit 132 searches for the maximum value and the minimum value of the input luminance signal in a horizontal direction. Similarly, the vertical direction minimum/maximum searching unit 133 searches for the maximum value and the minimum value of the input luminance signal in a vertical direction.

The RGB selection outputting unit 134 selects and outputs the RGB values which correspond to the larger maximum value and minimum value from among the maximum values and the minimum values in the horizontal and vertical directions using the input RGB signal.

Alternatively, the maximum value and the minimum value may be searched by selecting one of a horizontal direction and a vertical direction. In this case, the RGB selection outputting unit 134 outputs the RGB signal which corresponds to the searched maximum value and minimum value.

In the current embodiment, the luminance signal is used to measure the degree of the chromatic aberration. As described above, luminance indicates brightness information of an image and the chromatic aberration is more visible in a region having a large brightness difference. That is, the degree of the chromatic aberration may be measured using contrast information of the luminance signal. Accordingly, in order to measure the generation degree of the chromatic aberration, contrast of an image is obtained and locations of local minimum and maximum values of the luminance signal are respectively obtained in vertical and horizontal directions. Here, since such methods in vertical and horizontal directions are exactly the same as each other, searching in a horizontal direction is described herein.

Minimum and maximum values when the degree of chromatic aberration increases from left to right and minimum and maximum values when the degree of chromatic aberration decreases from left to right, are calculated as in Equation 16 below.

$$l_{E\,max} = \arg\max_{l \in \{l | 0 \leq l \leq L_1\}} Y_i(i,j+l)$$

$$l_{E\,min} = \arg\min_{l \in \{l | 0 \leq l \leq L_1\}} Y_i(i,j+l)$$

$$l_{W\,max} = \arg\max_{l \in \{l | -L_2 \leq l \leq 0\}} Y_i(i,j+l)$$

$$l_{W\,min} = \arg\min_{l \in \{l | -L_2 \leq l \leq 0\}} Y_i(i,j+l) \quad \text{[Equation 16]}$$

That is, two maximum values and two minimum values are obtained in a horizontal direction. When a tendency to increase is observed, the minimum value in the left side (which indicates W) and the maximum value in the right side (which indicates E) based on the current pixel are obtained. When a tendency to decrease is observed, the maximum value in the left side (which indicates W) and the minimum value in the right side (which indicates E) based on the current pixel are obtained.

Here, $I_{Emax}$, $I_{Emin}$, $I_{Wmax}$, and $I_{Wmin}$ respectively indicate the location of the maximum value in the right side, the location of the minimum value in the right side, the location of the maximum value in the left side, and the location of the minimum value in the left side.

The maximum values and the minimum values in the left and right sides are obtained in order to prevent the maximum values and the minimum values being gathered together in one side of the mask based on the current pixel. In this case, the difference between the maximum values and the minimum values cannot be observed using contrast information of the current pixel. One more thing to consider when obtaining the maximum values and the minimum values in both directions is to stop searching when a decrease tendency is observed while it is assumed as an increase tendency. Similarly, when an increase tendency is observed while it is assumed as a decrease tendency, searching is stopped. The coordinates of the minimum value and the maximum value having a larger difference therebetween are selected as those of final minimum and maximum values from among the detected two minimum values and two maximum values as in Equation 17.

If $(|Y_i(i,j+l_{E\,max})-Y_i(i,j+l_{W\,min})|>|Y_i(i,j+l_{W\,max})-Y_i(i,j+l_{E\,min})|)$ $l_{max}=l_{E\,max}$ $l_{min}=l_{W\,min}$ else $l_{max}=l_{W\,max}$ $l_{min}=l_{E\,min}$ [Equation 17]

Similar to a horizontal direction, the same process as above is performed in a vertical direction and coordinates of the maximum value and the minimum value, $k_{max}$ and $k_{min}$ in a vertical direction are obtained. Finally, the maximum values—the minimum values are obtained using the location values of the maximum values and the minimum values in a horizontal direction and a vertical direction. Then, the location of the maximum value and the minimum value having the larger value is defined as the location of the final local maximum value and minimum value in the current pixel and contrast information of the image is obtained using R, G, B at the location. R, G, B at the location of the maximum value and the minimum value are represented as R1, R2, G1, G2, B1, and B2 as in Equation 18.

If $(|Y_i(i,j+l_{max})-Y_i(i,j+l_{min})|>|Y_i(i+k_{max}j)-Y_i(i+k_{min}j)|)$ $R1=R_i(i,j+l_{max}), G1=G_i(i,j+l_{max}), B1=B_i(i+l_{max})$ $R1=R_i(i,j+l_{min}), G1=G_i(i,j+l_{min}), B1=B_i(i+l_{min})$ else $R1=R_i(i+k_{max}j), G1=G_i(i+k_{max}j), B1=B_i(i+k_{max}j)$ $R1=R_i(i+k_{min}j), G1=G_i(i+k_{min}j), B1=B_i(i+k_{min}j)$ [Equation 18]

Figure 7:
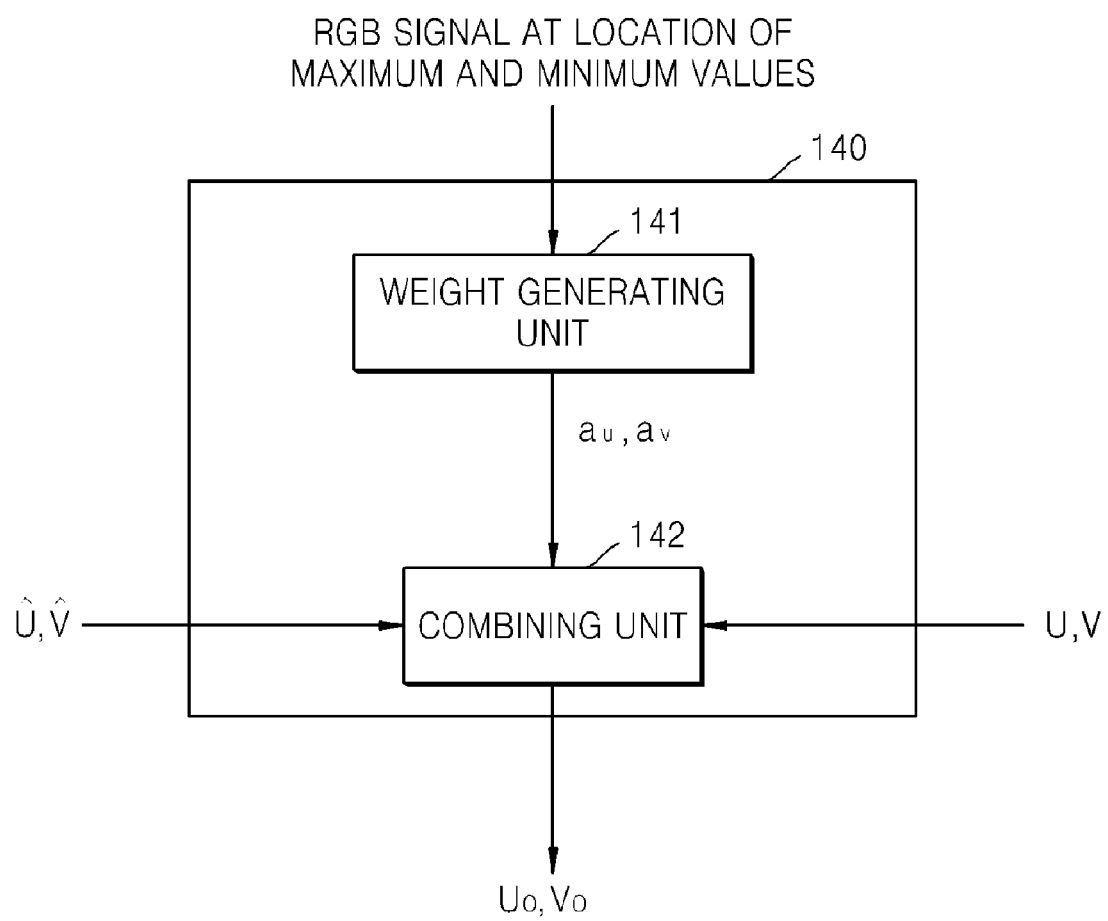
FIG. 7 is a block diagram of a chrominance signal combining unit according to an embodiment of the present invention.

FIG. 7 is a block diagram of the chrominance signal combining unit 140 according to an embodiment of the present invention.

Referring to FIG. 7, the chrominance signal combining unit 140 according to the present embodiment includes a weight generating unit 141 and a combining unit 142.

The weight generating unit 141 receives the RGB signals from the location of the maximum value and minimum value output from the chromatic aberration generation degree determining unit 130 and generates weights $a_u$ and $a_v$. The combining unit 142 combines input chrominance signals U and V and the chrominance signals Û and V̂ for correcting the chromatic aberration and outputs the final chrominance signal $U_0$ and $V_0$.

Contrast information in the U and V channels is obtained as in Equation 19 using R1, R2, G1, G2, B1, and B2 calculated using Equation 18

$contU=\max\{0.5\cdot|R1-R2|, |G1-G2|, |B1=B2|\}$ $contV=\max\{|R1-R2|, |G1-G2|, 0.5\cdot|B1-B2|\}$ [Equation 19]

Here, $a_u(i,j)$ and $a_v(i,j)$ are obtained as in Equation 20 using contU and contV.

$a_U(i,j)=1.0-f(contU)$ $a_V(i,j)=1.0-f(contV)$ [Equation 20]

Here, f( ) is denoted as a monotonically increasing function and returns a value ranging from 0 to 1. That is, the greater the contrast of an image, the more the weights $a_u(i,j)$ and $a_v(i,j)$ are determined to approximate to '0'. In this case, a chrominance signal for correcting chromatic aberration is used as a final output signal. Also, the less the contrast of the image, the more the weights $a_U(i,j)$ and $a_V(i,j)$ are determined to approximate to '1', and the closer the final output signal is to the original chrominance signal. In this case, the color of the original chrominance signal is maintained. However, in the case of R or G channel, when the color of the original chrominance signal is damaged, the damaged color is visible to people. Thus, when the color of the R or G channel is bright, the original color is maintained by reducing the degree of chromatic aberration.

FIG. 8 is a flowchart illustrating a method of eliminating chromatic aberration, according to an embodiment of the present invention.

Referring to FIG. 8, in operation 800, filtering is performed using a luminance/chrominance difference and an RGB gradient. In operation 802, a chrominance signal for correcting the chromatic aberration is generated according to the result of filtering. In operation 804, the generation degree of the chromatic aberration is measured using contrast information of an input luminance signal. In operation 806, according to the generation degree of the chromatic aberration, the chrominance signal for correcting the chromatic aberration generated in operation 802 and an input chrominance signal are combined.

According to an embodiment of the present invention, in the luminance/chrominance coordinates, only the chrominance signal is filtered so as to eliminate the chromatic aberration so that the chromatic aberration can be eliminated regardless of a property of a lens. In addition, since the chromatic aberration can be eliminated in each pixel, the invention can be realized using hardware. Also, there are advantages in not only eliminating the chromatic aberration but also preventing a resolution of the original image from being damaged.

The invention can also be embodied as computer readable code on a computer readable recording medium. The computer readable recording medium is any data storage device that can store data and or instructions which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of eliminating chromatic aberration, the method comprising:
   receiving RGB signals and luminance/chrominance signals obtained by converting the RGB signals and calculating RGB gradients using the RGB signals and a luminance/chrominance difference using the luminance/chrominance signals; and
   filtering the chrominance signal of the luminance/chrominance signal by reflecting the calculated RGB gradient and the luminance/chrominance difference and generating a chrominance signal for correcting the chromatic aberration.

2. The method of claim 1, wherein the luminance and chrominance signals comprise luminance and chrominance signals of a color space coordinates system including one of YUV, YCbCr, Lab and YCC.

3. The method of claim 1, further comprising:
   determining the generation degree of the chromatic aberration using the luminance signal; and combining the chrominance signal for correcting the chromatic aberration with the received chrominance signals according to the generation degree of the chromatic aberration.

4. The method of claim 3, wherein the RGB gradient and the luminance/chrominance difference are calculated in the horizontal and vertical directions, and the received chrominance signals are filtered using the RGB gradients and the luminance/chrominance difference, which are calculated in the horizontal direction, and are filtered the RGB gradients and the luminance/chrominance difference, which are calculated in the vertical direction.

5. The method of claim 4, further comprising selecting one of the chrominance signals obtained by filtering the received chrominance signals in the horizontal and vertical directions as a chrominance signal for correcting chromatic aberration.

6. The method of claim 5, wherein a chrominance signal having small intensity is selected from the chrominance signals obtained by filtering the received chrominance signals in the horizontal and vertical directions.

7. The method of claim 3, wherein the determining of the degree of chromatic aberration comprises:
   searching for the minimum and maximum values of the received luminance signal in the horizontal and vertical directions; and
   selecting and outputting RGB values corresponding to a larger minimum value and a maximum value from among the searched minimum and maximum values by using the RGB signals.

8. The method of claim 7, wherein the combining of the chrominance signal for correcting the chromatic aberration with the received chrominance signals comprises:
   generating weights by using the RGB values corresponding to the output minimum value and maximum value; and
   combining received chrominance signal for correcting the chromatic aberration with the received chrominance signals according to the generated weights.

9. The method of claim 3, further comprising:
   adjusting the received luminance signal according to the received chrominance signals; and
   converting the adjusted luminance signal and the result of combining input chrominance signal for correcting the chromatic aberration with the received chrominance signals into final RGB signals.

10. The method of claim 3, wherein the receiving of the RGB signals and the luminance and chrominance signals and the calculating of the RGB gradients and the luminance/chrominance difference comprises calculating a color difference between the R and G signals and the B and G signals using the RGB signals and the generating of the chrominance signal for correcting chromatic aberration comprises filtering the received chrominance signal by reflecting a larger value from among a gradient of the R signal and the calculated color difference between the R and G signals and a larger value from among a gradient of the B signal and the calculated color difference between the B and G signals.

11. A non-transitory computer readable recording medium having recorded thereto a computer program for executing the method of claim 1.

12. A method of generating a chrominance signal for correcting chromatic aberration of a current pixel, the method comprising calculating the chrominance signal for correcting chromatic aberration in a current pixel by assigning a weight to values of chrominance signals of pixels adjacent to the current pixel and averaging the resultant values from among luminance and chrominance signals converted from RGB signals, wherein the weight is calculated using RGB gradients of the adjacent pixels, a color difference of the adjacent pixels, and a luminance/chrominance difference between the current pixel and the adjacent pixels.

13. An apparatus for eliminating chromatic aberration, the apparatus comprising:
   a RGB gradient calculating unit calculating RGB gradients using RGB signals;
   a luminance/chrominance difference calculating unit receiving luminance/chrominance signals converted from the RGB signals and calculating a luminance/chrominance difference using the received luminance/chrominance signals; and
   a chrominance signal filtering unit filtering the chrominance signals by reflecting the calculated RGB gradients and the luminance/chrominance difference and generating a chrominance signal for correcting the chromatic aberration.

14. The apparatus of claim 13, wherein the luminance and chrominance signals comprise luminance and chrominance signals of a color space coordinates system including one of YUV, YCbCr, Lab and YCC.

15. The apparatus of claim 13, further comprising:
   a chromatic aberration generation degree determining unit determining the generation degree of chromatic aberration using the luminance signal; and
   a chrominance signal combining unit combining the chrominance signal for correcting chromatic aberration with the received chrominance signals according to the generation degree of chromatic aberration.

16. The apparatus of claim 15, wherein the RGB gradient calculating unit comprises:
   a horizontal direction RGB gradient calculating unit and a vertical direction gradient calculating unit which respectively calculate the RGB gradients in a horizontal direction and a vertical direction,
   the luminance/chrominance difference calculating unit comprises:
   a horizontal direction luminance/chrominance difference calculating unit and a vertical direction luminance/chrominance difference calculating unit which respectively calculate the luminance/chrominance difference in the horizontal direction and the vertical direction, and
   the chrominance signal filtering unit comprises:
   a horizontal direction chrominance filtering unit and a vertical direction chrominance signal filtering unit which respectively filter the received chrominance signals in the horizontal direction and the vertical direction using the RGB and the luminance difference calculated in the horizontal direction and the vertical direction; and
   a chrominance signal selecting unit for selecting one of the chrominance signals for correcting the chromatic aberration, which are obtained by filtering the received chrominance signals in the horizontal and vertical directions.

17. The apparatus of claim 16, wherein the chrominance signal selecting unit selects a signal having small intensity from among chrominance signals for correcting chromatic aberration, which are obtained by filtering the received chrominance signals in the horizontal and vertical directions.

18. The apparatus of claim 15, wherein the chromatic aberration generation degree determining unit comprises:
   horizontal and vertical direction minimum/maximum searching units searching for the minimum and maximum values of the received luminance signal in the horizontal and vertical directions; and a RGB selection outputting unit selecting and outputting RGB values corresponding to a larger minimum value and a maximum value from among the searched minimum and maximum values by using the RGB signals.

19. The apparatus of claim 18, wherein the chrominance signal combining unit comprises:
a weight generating unit generating weights by using the RGB values corresponding to the output minimum value and maximum value; and
a combining unit combining received chrominance signal for correcting the chromatic aberration with the received chrominance signals according to the generated weights.

20. The apparatus of claim 15, further comprising:
a luminance signal adjusting unit adjusting the received luminance signal by using the received chrominance signals; and
a RGB converting unit converting the luminance signal received from the luminance signal adjusting unit and the chrominance signal received from the chrominance signal combining unit into the RGB signals.

* * * * *